(12) United States Patent
Schneider

(10) Patent No.: US 6,334,407 B1
(45) Date of Patent: Jan. 1, 2002

(54) SQUIRREL CAFE

(76) Inventor: David P. Schneider, 4 Woodside Dr. East, Apalachin, NY (US) 13732

( * ) Notice: Subject to any disclaimer, the term of this patent is extended or adjusted under 35 U.S.C. 154(b) by 0 days.

(21) Appl. No.: 09/447,424

(22) Filed: Nov. 23, 1999

(51) Int. Cl.[7] ............................................. A01K 39/00
(52) U.S. Cl. ............................................... 119/51.01
(58) Field of Search ........................... 119/51.01, 454, 119/456, 464, 484, 482, 475

(56) References Cited

U.S. PATENT DOCUMENTS

| | | | | |
|---|---|---|---|---|
| 4,291,645 A | * | 9/1981 | Cruchelow et al. | 119/484 |
| 5,148,767 A | * | 9/1992 | Torchio | 119/484 |
| 5,165,366 A | * | 11/1992 | Harvey | 119/165 |
| 5,775,261 A | * | 7/1998 | Shaw | 119/482 |
| 5,842,438 A | * | 12/1998 | Messmer | 119/165 |
| 5,890,455 A | * | 4/1999 | Donchey | 119/484 |
| 5,970,914 A | * | 10/1999 | Steil et al. | 119/165 |
| 5,975,017 A | * | 11/1999 | Cameron | 119/165 |

* cited by examiner

Primary Examiner—Thomas Price

(57) ABSTRACT

To provide an enclosed, indoor squirrel feeding compartment which allows indoor viewing of the squirrels while they are feeding without allowing the squirrels access to the indoor area where the feeder is located. A generally transparent box is provided with a squirrel sized passageway which allows the squirrels into to the interior of the boxes' feeding compartment from an access port which is located out of doors. This enclosed passageway can lead through a window opening in the house or some other suitable naturally existing opening in the house's exterior shell.

19 Claims, 2 Drawing Sheets

SQUIRREL CAFE

FIELD OF THE INVENTION

The present invention pertains to squirrel feeding stations.

BACKGROUND OF THE INVENTION

To date, there are very few squirrel feeder or other types of wild animal feeder designs and of the ones available, all have been for feeding the animals at an out of doors location.

SUMMARY OF THE INVENTION

It is an object of the present invention to produce a squirrel or other types of wild animal feeder that permits squirrels or other types of wild animals to enter from out of doors into the interior of an inside room while they are enclosed inside the feeder so they may be more closely observed while feeding by the inhabitants in that room. It is another object of this invention to eliminate the need for people feeding the squirrels to go out of doors to load food inside the feeder. It is a further object of this invention to provide exercise mechanisms or toys that can be inserted inside the confines of the squirrel feeder or placed on the outside of the feeder that the squirrels or other wild animals may physically play with and perform upon.

It is still a further object of this invention to provide a squirrel or other types of wild animal feeder that may be closed to the entry of squirrels or other types of wild animal when the owner chooses to exclude the animals.

DESCRIPTION OF THE PREFERRED EMBODIMENTS

Figure 1:
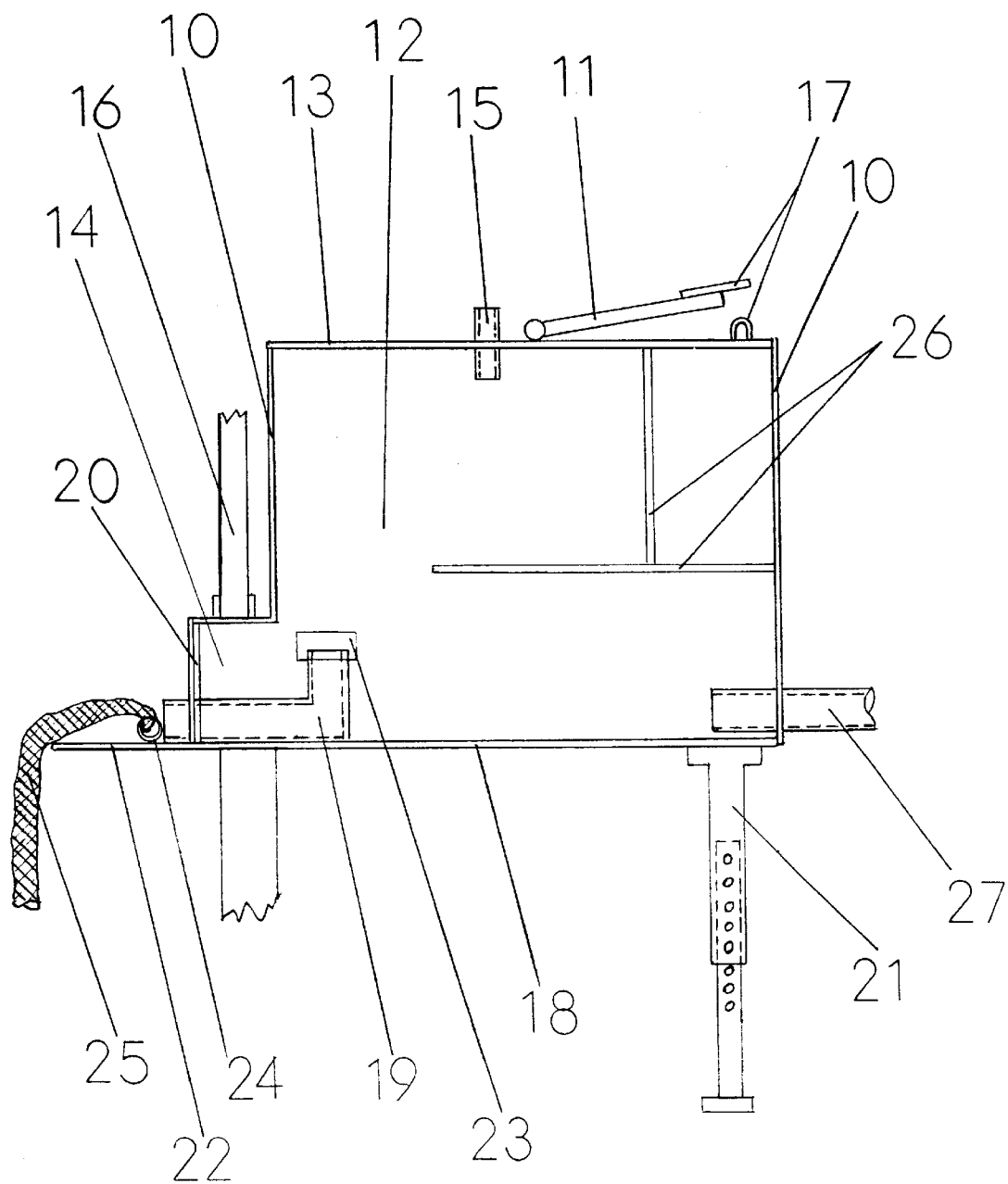
FIG. 1 is a side view of the squirrel feeder which embodies the invention's systems.

Referring now to the drawings wherein like reference characters indicate like parts in the several views, there is shown in FIG. 1 the squirrel feeder or other type of wild animal feeder's side view wherein the feeding compartment 12 with door 11 and side walls 10 sits upon adjustable support legs 21. In addition to the side walls 10, the floor 18 of the feeding compartment 12 and its ceiling 13 completely enclose the area where the squirrels feed and where they may be viewed while feeding and playing inside the squirrel feeder. A front chamber 14 is attached to the feeding compartment 12 and is used to support the front of the feeder underneath the window 16. This front chamber 14 is designed so that it may be expanded or shortened sideways. This is so it is capable of filling in the openings left on either side of the squirrel feeder if the window in which the squirrel feeder is placed is too wide to allow just the main body of the squirrel feeder to seal off the open window so the outside weather does not come inside the room. The squirrel or other types of wild animal entry port 19 is to provide the squirrels or other wild animals a way to access the interior of the squirrel or other wild animal feeder as it is positioned inside the user's house such access being made by the animal from it's natural habitat out of doors. May the reader please note: For the remainder of this patent's text, whenever the word "squirrel" is used, please be advised that all other wild animals are also contemplated as well as squirrels to be possibly using the invented feeder. It should be obvious that when animals other than squirrels do visit this feeder that they would be fed food in keeping with their feeding habits and that any toys employed during their visits would also be toys that were designed with that particular animal in mind. There can be a cap 23 secured onto the end of this squirrel entry passage so that squirrels can be excluded from entering the feeder if necessary. There is the feed tube 15 which allows placement of squirrel food into the feeding compartment 12 without the need to open door 11 which might allow a visiting squirrel to get out through the open door which could be a real nuisance. Also shown is the door latch 17 which provides for a lock to be placed on the door so small children can not open the feed compartment 12 if left alone with the squirrel feeder. The entry shelf 22 projects from the front of the front chamber 14 and provides the squirrel an entry platform. It has attached to it a anchor point 24 for a climbing rope 25 that allows a squirrel to climb up to the entry shelf from ground level which may be many building stories below the feeder's position if the user lives in a multi-story apartment house for example. Also shown are feed compartment partitions and secondary floors 26 which can be used to divide the overall space inside the feed compartment 12 into smaller spaces or rooms or even extra floor levels inside the feed compartment to keep the squirrel moving around into these several rooms formed inside the feed compartment 12. Such partitions could also be positioned inside the feed compartment 12 so that they formed a maze the squirrels would need to negotiate and master to reach a food treat at the maze's end. The feed compartment can be connected to other similar feed compartments or adjacent rooms by travel tubes 27. These travel tubes allow the squirrels access to many rooms which could be positioned at some distance from the original feed compartment entry port 19, even as far away as in some other room of the user's house or apartment. These other adjunct rooms in the squirrel cafe would provide space for the placement of squirrel toys or exercise equipment made small enough to fit inside the plastic enclosures. An example of one such piece of exercise equipment would be a wheel in which the squirrel could run and running long enough thereby receive a treat. Food rewards would provide an incentive to the squirrels to perform on such equipment if the equipment would be designed to issue forth a treat for the squirrel who properly performed the activity required by the toy or piece of exercise equipment. Other types of materials could also be used for the construction of the unit. Acrylic plastic is mentioned as an example of a material useful for the unit's construction. However, other materials such as glass or wire mesh screening and so on could be used in the unit's construction.

Figure 2:
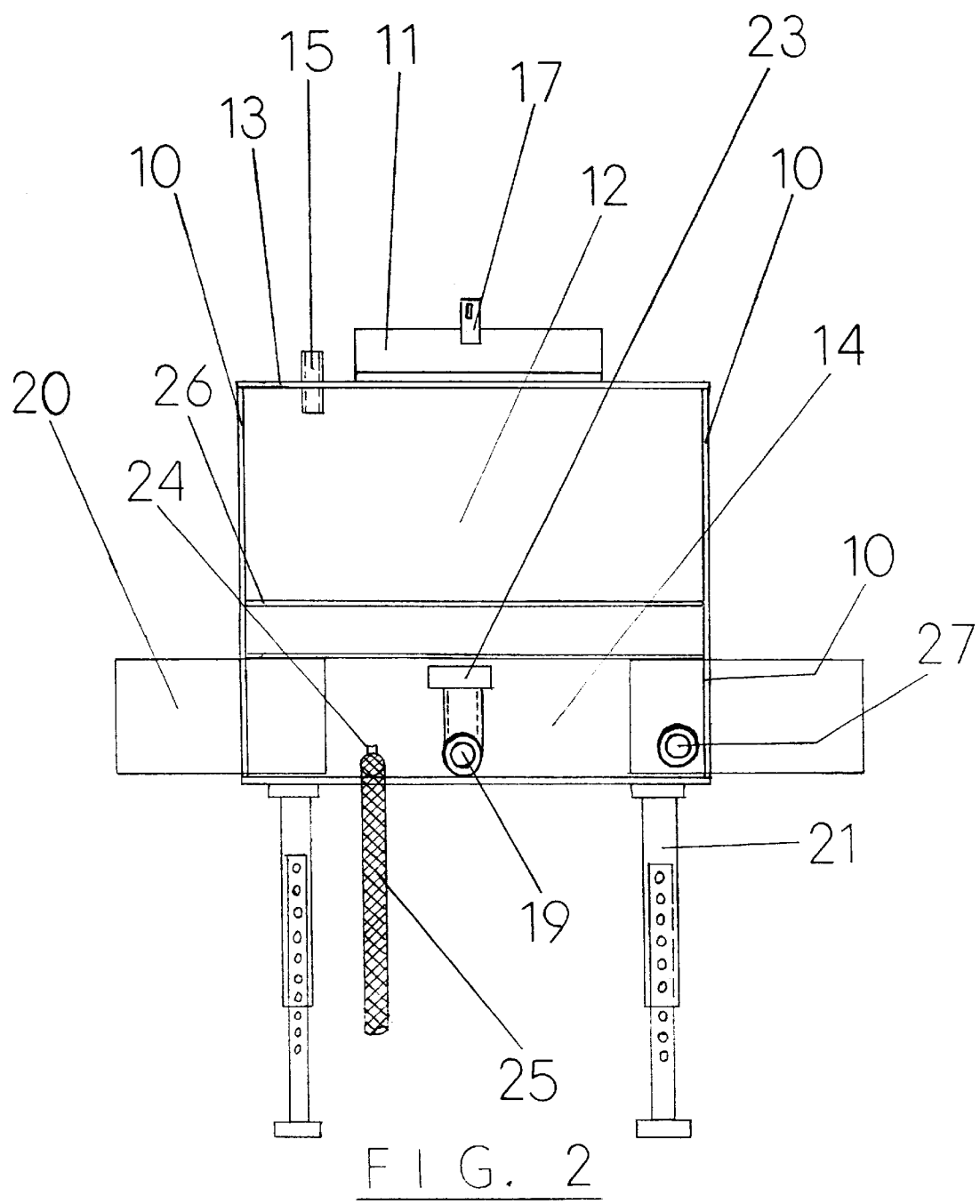
FIG. 2 is a front view of the squirrel feeder shown in FIG. 1.

FIG. 2 shows the front view of the squirrel feeder which displays the sliding doors 20 that are used to block shut the empty window space on either side of the squirrel feeder when it is situated in a window that is too wide for it.

Contrary to the FIG. 1 arrangement of the feeding compartment and squirrel's entryway, the entryway could be positioned on the top of the feeding chamber or underneath the feeding chamber or even some other configuration without changing the overall basic teaching this patent provides of an indoor squirrel feeder accessed by the squirrels from out of doors.

Although the drawings show a structure that is more or less cubic in its configuration, other embodiments of this squirrel feeder concept could display a cylindrical shape overall or a spherical shape or any other basic shape without violating the concept here presented of an indoor squirrel feeder.

Certain permanent attachments could be designed into the feeding compartment that would accommodate the easy attachment of various forms of squirrel toys and exercise equipments on the inside of the feeding compartment where the visiting squirrels could perform tricks and entertaining play activities for the owner of the squirrel or other wild animal cafe to observe.

I claim:

1. A wild animal feeder and/or play box, comprising:

a) a solid compartment fully devoid of unclosured, unlocked openings and fully contained by a surrounding building, comprising at least one feeding chamber walled in on all sides; and b) a wild animal sized enclosed passageway emanating from a predetermined position inside said feeding chamber through an opening in one of the outside walls of said building, said enclosed passageway being open ended outside of said outside building wall to the outdoors surrounding said building with said compartment being thereby accessible for entry by said wild animal through said enclosed passageway from its natural wild outdoor habitats.

2. The indoor wild animal feeder and/or play box of claim 1 wherein said at least one chamber is constructed of materials selected from the group of transparent plastic, wire mesh, and glass.

3. The indoor wild animal feeder and/or play box of claim 1 wherein said building is a human dwelling and a portion of said at least one chamber is sized to fit an outside opening in the shell of said human dwelling.

4. The indoor wild animal feeder and/or play box of claim 1 further comprising a second wild animal sized passageway emanating from a second predetermined position inside said at least one chamber.

5. The wild animal feeder and/or play box of claim 1 wherein said at least one chamber has at least one lockable door.

6. The indoor wild animal feeder and/or play box of claim 1 wherein said at least one chamber has internal partitions.

7. The indoor wild animal feeder and/or play box of claim 1 wherein said at least one chamber has food introduction means.

8. The indoor wild animal feeder and/or play box of claim 1 wherein said at least one chamber has legs to support its weight.

9. A wild animal feeder and/or play compartment comprising:

a) at least one compartment substantially enclosed on all sides to prevent the escape of a wild animal; and b) a wild animal sized passageway emanating from a predetermined position inside said at least one compartment through an outside opening of a building and accessible for entry by said wild animal from its natural outdoors habitat.

10. The indoor wild animal feeder and/or play compartment of claim 9 wherein said at least one compartment is constructed at least in part of transparent materials.

11. The indoor wild animal feeder and/or play compartment of claim 9 wherein said at least one compartment is constructed at least in part of wire mesh.

12. The indoor wild animal feeder and/or play compartment of claim 9 wherein said at least one compartment is constructed at least in part of glass.

13. The indoor wild animal feeder and/or play compartment of claim 9 wherein said at least one compartment is constructed at least in part of plastic.

14. The indoor wild animal feeder and/or play compartment of claim 9 wherein a portion of said at least one compartment is sized to fit an outside opening in the shell of a human dwelling.

15. The indoor wild animal feeder and/or play compartment of claim 9 further comprising a second wild animal sized passageway emanating from a second predetermined position inside said at least one compartment.

16. The indoor wild animal feeder and/or play compartment of claim 9 wherein said at least one compartment has at least one lockable door.

17. The indoor wild animal feeder and/or play compartment of claim 9 wherein said at least one compartment has internal partitions.

18. The indoor wild animal feeder and/or play compartment of claim 9 wherein said at least one compartment has food introduction means.

19. The indoor wild animal feeder and/or play compartment of claim 9 wherein said at least one compartment has a weight supporting structure.

* * * * *